(12) United States Patent
Kim

(10) Patent No.: US 11,993,128 B2
(45) Date of Patent: May 28, 2024

(54) APPARATUS FOR ABSORBING SHOCK AND CONTROL METHOD THEREOF

(71) Applicants: Hyundai Motor Company, Seoul (KR); Kia Corporation, Seoul (KR)

(72) Inventor: Jong Won Kim, Chungcheongnam-do (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 38 days.

(21) Appl. No.: 17/839,020

(22) Filed: Jun. 13, 2022

(65) Prior Publication Data

US 2023/0173870 A1    Jun. 8, 2023

(30) Foreign Application Priority Data

Dec. 2, 2021 (KR) .................. 10-2021-0171079

(51) Int. Cl.
| | |
|---|---|
| *B60H 1/00* | (2006.01) |
| *B64C 39/02* | (2023.01) |
| *B64D 9/00* | (2006.01) |
| *B64D 47/00* | (2006.01) |
| *B64U 101/60* | (2023.01) |
| *F25B 41/20* | (2021.01) |

(52) U.S. Cl.
CPC ....... *B60H 1/00271* (2013.01); *B64C 39/024* (2013.01); *B64D 9/00* (2013.01); *B64D 47/00* (2013.01); *F25B 41/20* (2021.01); *B64U 2101/60* (2023.01); *F25B 2400/16* (2013.01); *F25B 2600/2507* (2013.01)

(58) Field of Classification Search
CPC .... B60H 1/0027; F25B 41/20; F25B 2400/16; F25B 2600/2507; F25B 45/00; F25B 49/005; F25B 2700/4104; B64D 9/00; B64D 2013/0625; B64D 2013/0674; B64D 2201/00; B64D 13/08
See application file for complete search history.

(56) References Cited

U.S. PATENT DOCUMENTS

| | | | | |
|---|---|---|---|---|
| 2,506,806 A | * | 5/1950 | Metzger | ............... G01N 31/222 |
| | | | | 73/29.02 |
| 4,803,843 A | * | 2/1989 | Otto | .................... G01N 33/0016 |
| | | | | 62/85 |
| 6,367,838 B1 | * | 4/2002 | Faigle | ..................... B60R 21/26 |
| | | | | 280/736 |
| 6,422,035 B1 | * | 7/2002 | Phillippe | ................. F25B 40/04 |
| | | | | 62/509 |
| 2008/0315037 A1 | | 12/2008 | Merz et al. | |
| 2009/0287202 A1 | * | 11/2009 | Ingle | ...................... A61B 18/02 |
| | | | | 606/21 |
| 2020/0376926 A1 | * | 12/2020 | Nishiyama | ......... B60H 1/00778 |

FOREIGN PATENT DOCUMENTS

JP    2009-520621 A    5/2009

* cited by examiner

*Primary Examiner* — Kun Kai Ma
(74) *Attorney, Agent, or Firm* — Fox Rothschild LLP

(57) ABSTRACT

An apparatus is provided for absorbing shocks and a control method capable of protecting cargo from shocks without a separate additional system in a cargo hold of a moving object. The apparatus for absorbing shocks includes at least one inflatable member disposed in a moving object, an air conditioner module installed on the moving object, and a supply pipe connected between the air conditioner module and the inflatable member and providing a refrigerant of the air conditioner module to the inflatable member.

18 Claims, 7 Drawing Sheets

APPARATUS FOR ABSORBING SHOCK AND CONTROL METHOD THEREOF

CROSS-REFERENCE TO RELATED APPLICATION

This application claims under 35 U.S.C. § 119(a) the benefit of Korean Patent Application No. 10-2021-0171079 filed on Dec. 2, 2021 in the Korean Intellectual Property Office, the entire contents of which is incorporated herein by reference.

TECHNICAL FIELD

Background

Technical Field

The present disclosure relates to an apparatus for absorbing shocks and a control method capable of protecting cargo from shocks without a separate additional system in, for example, a cargo hold of a moving object.

Description of the Related ArtUrban air mobility (UAM) is a three-dimensional (3D) urban air transportation system connecting land and air and is expected to be able to transport people and cargo in the urban sky within a short time.

Because such a mobility flies in the sky by its nature, if cargo inside the cargo hold moves, the cargo may be damaged, and, in an emergency, a structure of a mobility may also be damaged, and even a person on board (pilot or passenger) together may also be injured.

To solve this problem, a method of physically fixing the cargo by installing a fixing mechanism inside the cargo hold has been proposed, but there are still limitations in that the cargo cannot be protected and shocks may be applied on people inside the boarding space when a physical shock such as an emergency has occurred.

In addition, a separate apparatus for absorbing shocks may be installed, but development of ancillary parts and addition of a system are required therefor, which increases the weight of the mobility and limits a cruising distance of the mobility.

SUMMARY

An embodiment of the present disclosure may provide an apparatus for absorbing shocks and a control method capable of protecting cargo from shocks without a separate additional system in, for example, a cargo hold of a moving object.

According to an embodiment of the present disclosure, an apparatus for absorbing shocks may include at least one inflatable member disposed in a moving object; an air conditioner module installed on the moving object; and a supply pipe connected between the air conditioner module and the inflatable member and providing a refrigerant of the air conditioner module to the inflatable member.

The inflatable member may be installed in the cargo hold in the moving object and may be disposed to be interposed in at least one of: between a wall portion of the cargo hold and a cargo, between a ceiling of the cargo hold and a cargo, and between cargoes.

The apparatus may further include a temperature sensor installed in the moving object to detect a temperature.

The air conditioner module may include a case fixed to the moving object and having an air flow path, an evaporator installed on an air flow path in the case to heat-exchange air passing therethrough with a refrigerant flowing therein, a compressor applying pressure to the refrigerant introduced after heat-exchange in the evaporator, a condenser condensing the refrigerant compressed by the compressor, an expansion valve depressurizing and expanding the refrigerant passing through the condenser, and a refrigerant line circulating the refrigerant, wherein the supply pipe is connected to the refrigerant line via a first valve member.

The air conditioner module may include a refrigerant tank storing the refrigerant in a liquid state passing through the condenser.

The first valve member may be a three-way valve, and the first valve member may be disposed between the expansion valve and the evaporator in the refrigerant line.

The first valve member may be a three-way valve, and the first valve member may be disposed between the compressor and the condenser in the refrigerant line.

The apparatus may further include a recovery pipe connected between the air conditioner module and the inflatable member to recover the refrigerant of the inflatable member to the air conditioner module.

One end portion of the recovery pipe may be connected to an outlet of the inflatable member, and the other end portion of the recovery pipe may be connected between the evaporator and the compressor in the refrigerant line.

A second valve member may be provided in the recovery pipe, and the refrigerant may be recovered from the inflatable member through an operation of the second valve member and an operation of the compressor.

The apparatus may further include a controller installed in the moving object configured to selectively control the operation of the first valve member together with the operation of the expansion valve.

The controller may be electrically connected to a pressure sensor of the inflatable member, and may be configured to adjust an opening amount of a port adjacent to a supply pipe of the first valve member by controlling the operation of the first valve member until pressure of the refrigerant in the inflatable member detected by the pressure sensor reaches a target pressure.

According to another embodiment of the present disclosure, a control method of an apparatus for absorbing shocks may include determining whether a predetermined situation of a moving object has occurred; and supplying at least a portion of the refrigerant in the refrigerant line of the air conditioner module to the inflatable member installed in the moving object to inflate the inflatable member, when the predetermined situation has occurred.

The control method may further include storing a liquid refrigerant in a refrigerant tank of the air conditioner module at a predetermined pressure.

In the determining of whether the predetermined situation has occurred, the controller installed in the moving object may determine whether the predetermined situation has occurred based on at least one of a failure signal, a fall signal, and a signal received from an input unit.

The control method may further include, if the predetermined situation does not occur, blocking a flow path adjacent to a supply pipe connected to the refrigerant line; and operating a cooling cycle of the air conditioner module.

The control method may further include, when the predetermined situation has occurred, determining whether it is necessary to control temperature inside the moving object. When temperature control is not required, the control method may include blocking a portion of the refrigerant line and opening a flow path adjacent to a supply pipe connected to the refrigerant line. When temperature control is required, the control method may include communicating the refrigerant line and the flow path adjacent to the supply pipe with each other.

According to another embodiment of the present disclosure, a control method of an apparatus for absorbing shocks may include operating a cooling cycle of an air conditioner module in a moving object; and supplying at least a portion of a refrigerant in the refrigerant line of the air conditioner module to an inflatable member installed in the moving object to inflate the inflatable member.

The inflating of the inflatable member may include communicating the refrigerant line and the flow path adjacent to the supply pipe connected to the refrigerant line with each other.

The control method may further include determining whether a pressure of a refrigerant in the inflatable member is equal to or greater than a target pressure. If the pressure of the refrigerant in the inflatable member is less than the target pressure, the control method may include increasing a flow rate of the refrigerant adjacent to the supply pipe until the pressure of the refrigerant in the inflatable member reaches the target pressure. If the pressure of the refrigerant in the inflatable member is equal to or greater than the target pressure, the control method may include blocking the flow path adjacent to the supply pipe.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Figure 1:
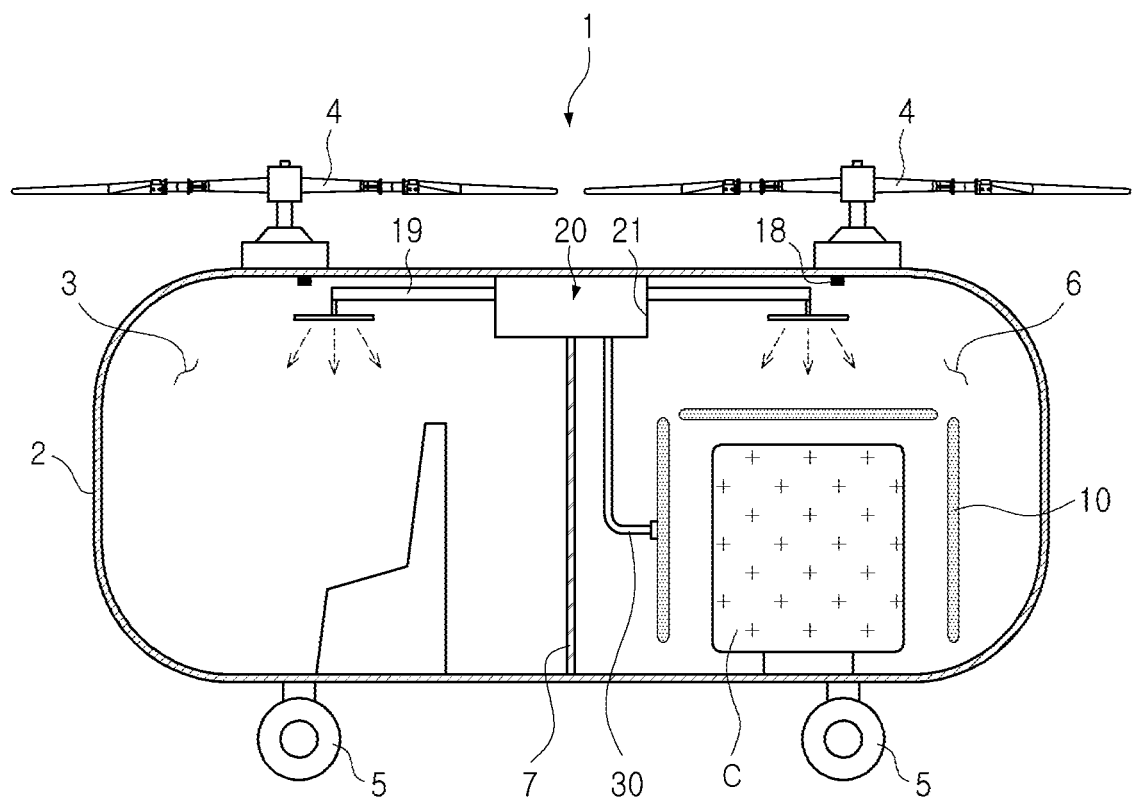
FIG. 1 is a diagram schematically illustrating a moving object to which an apparatus for absorbing shocks according to an exemplary embodiment of the present disclosure is applied.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

Exemplary embodiments of the present disclosure will now be described in detail with reference to the accompanying drawings. In the drawings, the same reference numerals will be used throughout to designate the same or equivalent elements. In addition, a detailed description of well-known features or functions will be ruled out in order not to unnecessarily obscure the gist of the present disclosure.

In the present disclosure, a moving object may refer to a variety of transportation means for moving a transported object, such as a person, an animal, or cargo, from a departure point to a destination. These moving objects are not limited to vehicles traveling on roads or tracks, and may include unmanned drones, air mobility, water or underwater mobility, moving robots, and the like.

For convenience of explanation, the present disclosure is described by taking a case in which the moving object is a manned aircraft having a cargo hold as an example, but the present disclosure is not necessarily limited thereto.

In addition, terms such as first and second may be used to describe various components, but these components are not limited in order, size, location, and importance by terms such as first and second, and are named only for the purpose of distinguishing one component from another.

Figure 2:
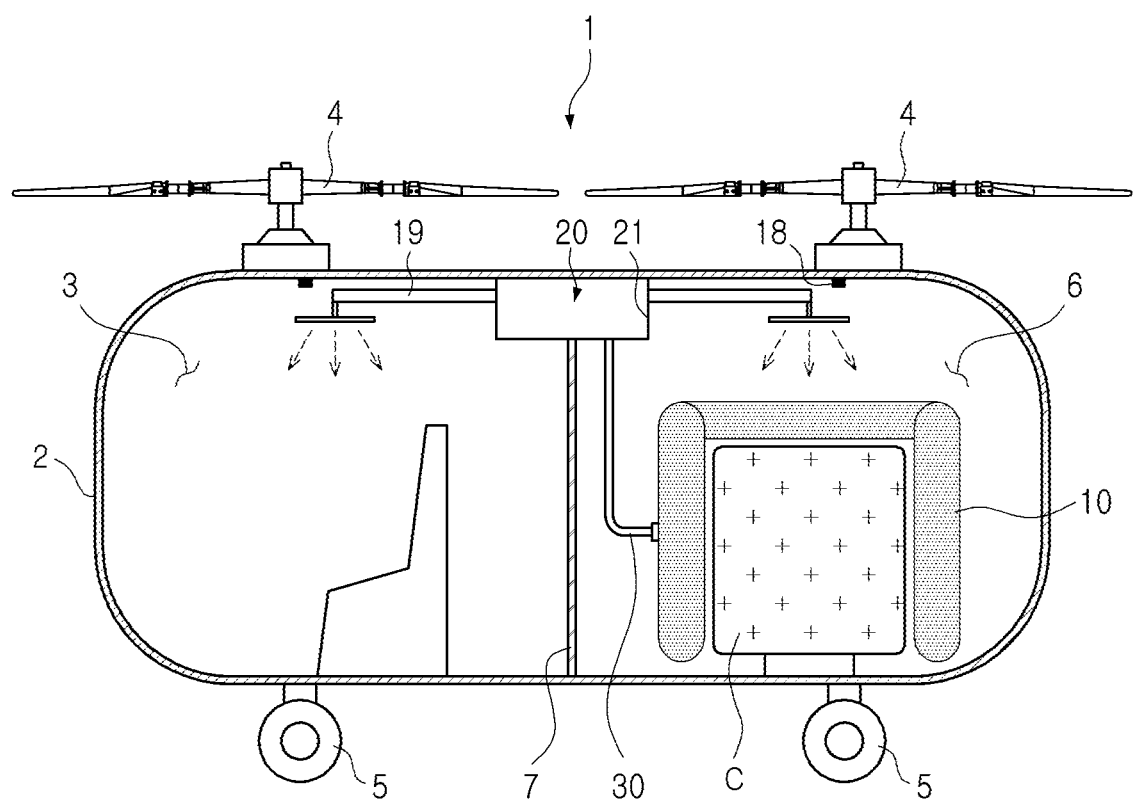
FIG. 2 is an operation state diagram of the apparatus for absorbing shocks according to an exemplary embodiment of the present disclosure illustrated in FIG. 1.

FIG. 1 is a diagram schematically illustrating a moving object to which an apparatus for absorbing shocks according to an exemplary embodiment of the present disclosure is applied, and FIG. 2 is an operation state diagram of the apparatus for absorbing shocks according to an exemplary embodiment of the present disclosure illustrated in FIG. 1.

The apparatus for absorbing shocks according to an exemplary embodiment of the present disclosure may be applied to a moving object 1 such as an urban air mobility (UAM) that can vertically take off and land. Such a UAM may be used for an individual or a plurality of passengers to move in cities or between cities. Examples of the moving object are not limited to UAMs, but embodiments of the apparatus for absorbing shocks may be applied to various manned or unmanned moving objects.

A moving object such as a UAM may be fast and convenient to get on and off and load cargo in a city, may provide a comfortable ride for passengers, may ensure safety, and may provide the cargo with a function to protect against shocks to reduce damage during transportation.

To this end, the moving object 1 includes a fuselage 2 including a boarding space 3 and a boarding gate; and a plurality of rotors 4 provided on the fuselage. The boarding space of the fuselage may accommodate at least one person. The plurality of rotors may be provided for vertical take-off and landing and horizontal flight of the fuselage.

Each rotor 4 may be driven by a motor (not shown), and a battery (not shown) may be mounted on the fuselage 2 to supply electric energy to the motor.

In addition, a plurality of independently drivable wheels 5 may be provided at a lower portion of the fuselage to support the fuselage 2 at a boarding site or to move on the ground.

For example, when the moving object 1 is a land mobility such as an autonomous vehicle, a plurality of rotors may be omitted and a plurality of wheels 5 may be mounted on the fuselage 2, and each wheel may have an independent motor (not shown) to move the fuselage on the ground.

The fuselage 2 of the moving object 1 may include a cargo hold 6 for loading a cargo C. In addition, a protective wall 7 may be installed between the boarding space 3 and the cargo hold 6 or at a specific position of the cargo hold in order to protect the boarding space (or cockpit) from shocks due to the cargo.

When transporting the cargo C by the moving object 1, a fixing mechanism may be installed inside the cargo hold 6 to physically fix the cargo. Such a fixing mechanism should be able to maintain a posture and position of the cargo in all movements of the moving object, for example, rotational movements such as rolling, pitching, and yawing of the moving object that may occur during horizontal movement, takeoff, landing, turning, and hovering.

However, as described above, when a physical shock such as an emergency has occurred, the cargo C cannot be protected only by the fixing mechanism, and in severe cases, the cargo may move out of the original posture and position in the cargo hold 6 and move in the cargo hold to apply shocks to a person inside the boarding space 3.

For this reason, an appropriate means for protecting the structure or person of the moving object from shocks caused by the cargo, as well as protecting the cargo C from an external shock in the cargo hold 6 of the moving object 1, is desired.

The apparatus for absorbing shocks according to an exemplary embodiment of the present disclosure may include at least one inflatable member 10, an air conditioner module 20, and a supply pipe 30.

The inflatable member 10 may be installed in the protective wall 7 of the cargo hold 6 to prevent damage to the accommodated cargo C. For example, the inflatable member may be installed on the wall portions in four directions (front, rear, left and right) of the cargo hold and the ceiling of the cargo hold, and arranged to surround the cargo. In addition, the inflatable member may be installed to hang from the ceiling of the cargo hold to be sandwiched between cargoes.

Accordingly, the inflatable member 10 may be interposed between the wall portion of the cargo hold 6 and the cargo C, between the ceiling of the cargo hold and the cargo, or between cargoes to prevent direct contact between the cargo and the cargo hold or between the cargoes, thereby absorbing shock energy to protect the cargo from an external shock.

The inflatable member 10 may include a sealed inner bag formed of, for example, a plastic such as polyethylene, nylon, etc. or a rubber material. Also, the inflatable member 10 may further include an outer bag inflated to act to protect the inflatable inner bag. The outer bag may be formed of a material such as paper, fabric, or plastic.

An inlet 11 (refer to FIGS. 3 to 5) for introducing a gaseous refrigerant may be formed on one side of the inner bag. If there is an outer bag, the inlet may be coupled to the inner bag so that the inlet protrudes out of the outer bag.

Selectively, the inflatable member 10 may include a pressure sensor 12 (refer to FIGS. 3 to 5) for detecting pressure of the refrigerant introduced into the inflatable member.

The pressure sensor 12 may be installed in the inflatable member 10 to detect pressure of the refrigerant in the inflatable member, and output a detection signal to the controller 50 (refer to FIGS. 3 to 5) to be described later. For example, the pressure sensor may be installed at the inlet 11 of the inflatable member 10, but a position thereof is not necessarily limited thereto and may be installed in the inflatable member if the pressure sensor may be able to transmit a detection signal.

The inflatable member 10 may be initially placed in a contracted state between the wall portion of the cargo hold 6 and the cargo C, between the ceiling of the cargo hold and the cargo, or between cargoes, and thereafter, the inflatable member 10 may inflate to be expanded as a refrigerant of the air conditioner module 20 is introduced with a predetermined pressure.

In addition, it may be desired to withdraw the refrigerant from the developed and expanded inflatable member 10 to contract the inflatable member 10 to its initial state. To this end, an outlet 13 (refer to FIG. 5) for outflow of the refrigerant may be selectively formed at the other side of the inner bag. If there is an outer bag, the outlet may be coupled to the inner bag so that the outlet protrudes out of the outer bag.

The apparatus for absorbing shocks according to an exemplary embodiment of the present disclosure may further include a temperature sensor 18 installed in the moving object 1 to detect a temperature.

In an exemplary embodiment, the temperature sensor 18 may be installed in the moving object 1 to detect a temperature inside the moving object. For example, the temperature sensor may measure a temperature of at least one of the boarding space 3 and the cargo hold 6. The detection signal of the temperature sensor may be transmitted to the controller 50 to be described later. For example, the temperature sensor may be installed on a ceiling or a wall portion adjacent to the ceiling in the moving object, but a position thereof is not necessarily limited thereto.

The controller 50 may be configured to control an operation of the air conditioner module 20 according to a temperature inside the moving object 1 detected by the temperature sensor 18, so that a temperature inside the moving object may be adjusted.

The air conditioner module 20 may be installed in the moving object 1 to circulate internal air or introduce external air into the moving object to cool the air, so that the inside of the moving object, that is, the boarding space 3 and/or the cargo hold 6 may be cooled.

For example, the air conditioner module 20 may be installed on the ceiling or roof of the moving object 1, and may be disposed to extend over the boarding space 3 and the cargo hold 6. However, the present disclosure is not necessarily limited thereto, and an installation position and arrangement relationship of the air conditioner module in the moving object may be appropriately changed according to conditions.

As illustrated in FIGS. 1 to 5, the air conditioner module 20 may include a case 21, an evaporator 22, a blower 23, a compressor 24, a condenser 25, and an expansion valve 31.

The case 21 may be fixedly installed on the ceiling or roof of the moving object 1, and an air flow path including an intake port and an exhaust port may be formed in the case. For example, the evaporator 22 may be installed in an air flow path in the case. The air flow path may be connected to a duct 19 provided inside the moving object through the exhaust port of the case.

The evaporator 22 may be installed on the air flow path formed in the case 21, and a refrigerant line 29 may be connected thereto. The refrigerant flowing inside the evaporator and air passing through the evaporator may exchange heat with each other, so that the evaporator may cool the air, that is, internal or external air.

The refrigerant in the evaporator 22 may be sent to the condenser 25 by the compressor 24 and circulated back to the evaporator. The circulation of the refrigerant may be made along the refrigerant line 29.

The blower 23 may be a blowing unit for blowing air cooled by the evaporator to the duct 19, while passing through the evaporator 22. The blower may be configured as, for example, an axial flow fan driven by a motor (not shown).

The compressor 24 may apply a strong pressure to the refrigerant introduced after heat exchange in the evaporator 22 to produce a high-temperature and high-pressure gaseous refrigerant. The compressor may be driven by a separate motor (not shown), and the refrigerant may circulate by the operation of the compressor.

Selectively, the air conditioner module 20 may include, between the evaporator 22 and the compressor 24, an accumulator 27. The accumulator 27 may be configured to supply only a gaseous refrigerant, extracted from among refrigerants in which the liquid and gas are mixed that have passed through the evaporator, to the compressor.

In order to supply only the gaseous refrigerant to the compressor 24, the accumulator 27 may store the liquid refrigerant among the refrigerants in which the gas and liquid are mixed, and then vaporizes the stored liquid refrigerant to return the same to the compressor. Thus, the accumulator may improve efficiency and durability of the compressor.

The condenser 25 may condense the refrigerant compressed by the compressor 24. A cooling blower 26 for cooling the condenser by external air may be integrated into the condenser. The cooling blower may be configured as, for example, a propeller-type fan driven by a motor (not shown).

The refrigerant transferred from the compressor 24 to the condenser 25 may undergo a phase change, while being forcibly cooled by air in the condenser, to be converted into a low-temperature and high-pressure liquid refrigerant.

Selectively, the air conditioner module 20 may include a refrigerant tank 28 for storing the refrigerant in a liquid state that has passed through the condenser 25.

In this case, the high-pressure liquid refrigerant condensed in the condenser 25 to be phase-changed may be transferred to and stored in the refrigerant tank 28. The refrigerant tank may be formed to store a sufficient amount of refrigerant that may be supplied to the inflatable member 10 even if the refrigerant is not circulated.

The expansion valve 31 may depressurize and expand the refrigerant passing through the condenser 25 or the condenser and the refrigerant tank 28.

The high-pressure liquid refrigerant in the refrigerant line 29 or refrigerant tank 28 may be supplied to the evaporator 22 through the expansion valve 31. At this time, the expansion valve may reduce the pressure, while throttling the high-pressure refrigerant, thereby making the refrigerant into a low-temperature, low-pressure spray state that may be easier to evaporate.

In this manner, the refrigerant may be supplied back to the evaporator 22 in a sprayed state from the expansion valve 31, and the evaporator vaporizes the refrigerant into a gaseous state. During vaporization, the refrigerant absorbs heat around the evaporator, thereby cooling the air.

The air cooled by being deprived of heat may be provided to the boarding space 3 and the cargo hold 6 of the moving object 1 through a duct 19 to lower the temperature inside the moving object. The refrigerant expanded through the evaporator 22 may be transferred back to the compressor 24 and recirculated.

The supply pipe 30 may be connected between the air conditioner module 20 and the inflatable member 10. Specifically, the supply pipe may connect the refrigerant line 29 of the air conditioner module to the inflatable member to supply the gaseous refrigerant to the inflatable member. The supply pipe may be formed of a flexible material that is easy to deform, but is not limited thereto. For example, a pipe formed of metal or plastic material may also be adopted.

One end portion of the supply pipe 30 may be hermetically connected to the inlet 11 of the inflatable member 10. When a plurality of inflatable members are used, one end portion of the supply pipe may be divided into a plurality of branch pipes, each branch pipe may be connected to an inlet of a corresponding inflatable member.

The other end portion of the supply pipe 30 may be connected to the refrigerant line 29 of the air conditioner module 20 via a first valve member 32. In this case, a three-way valve may be employed as the first valve member.

In an exemplary embodiment, a three-way valve may be used to couple the refrigerant line 29 to the supply pipe 30. Such a three-way valve may be an electric three-way valve driven by a motor (not shown) connected to a separate power source under the control of the controller 50 to be described later. As an internal valve body according to the driving of the motor rotates at a predetermined angle based on a zero point, for example, opening and closing or an opening degree of the three-way valve may be controlled to determine a flow direction and flow path of the refrigerant, and a flow rate of the refrigerant flowing to the refrigerant line 29 or the supply pipe 30 may be adjusted.

For example, the first valve member 32 may be disposed between the expansion valve 31 and the evaporator 22 in the refrigerant line 29. In this case, a first port 33 of the first valve member may be connected to the expansion valve 31, a second port 34 may be connected to the evaporator 22, and a third port 35 may be connected to the supply pipe 30.

However, the arrangement of the first valve member 32 in the refrigerant line 29 is not necessarily limited to the example described above. For example, the first valve member may be disposed between the compressor 24 and the condenser 25 in the refrigerant line. In this case, the first port 33 of the first valve member may be connected to the compressor 24, the second port 34 may be connected to the condenser 25, and the third port 35 may be connected to the supply pipe 30.

The apparatus for absorbing shocks according to an exemplary embodiment of the present disclosure may further include a recovery pipe 40 (refer to FIG. 5) selectively connected between the air conditioner module 20 and the inflatable member 10 to collect the refrigerant of the inflatable member from to the air conditioner module.

Specifically, the recovery pipe 40 may connect the refrigerant line 29 of the air conditioner module 20 to the inflatable member 10 to recover a gaseous refrigerant from the inflatable member to the air conditioner module. The recovery pipe may be formed of a flexible material that is easy to deform, but is not limited thereto. For example, a pipe formed of metal or plastic material may be adopted.

One end portion of the recovery pipe 40 may be hermetically connected to the outlet 13 of the inflatable member 10. When a plurality of inflatable members 10 are used, one end portion of the recovery pipe may be divided into a plurality of branch pipes, each branch pipe may be connected to an outlet of the corresponding inflatable member.

The other end portion of the recovery pipe 40 may be directly connected to the refrigerant line 29 of the air conditioner module 20. For example, the recovery pipe may be connected between the evaporator 22 and the compressor 24 in the refrigerant line, or when the accumulator 27 is provided, the recovery pipe may be connected between the accumulator and the compressor.

A second valve member 42 (refer to FIG. 5) may be mounted on the recovery pipe 40, and in this case, a check valve may be employed as the second valve member.

The second valve member 42 may be an electric check valve driven by a motor (not shown) connected to a separate power source under the control of the controller 50 to be described later.

The apparatus for absorbing shocks according to an exemplary embodiment of the present disclosure may further include a controller 50 installed on the moving object 1 and selectively controlling the operation of the first valve member 32 together with the operation of the air conditioner module 20.

The controller 50 may be implemented with various processing devices such as a microprocessor, in which a semiconductor chip configured to perform various operations or commands, etc. may be embedded, and configured to control a general operation of the air conditioner module 20 to adjust temperature inside the moving object 1.

For example, the controller 50 may be incorporated into a higher control system of the moving object 1 or may be used for both purposes.

Specifically, the controller 50 may be configured to instruct an operation of the first valve member 32 and the expansion valve 31 to inflate the inflatable member 10 by determining failure or a fall of the moving object 1 by itself or according to a determination result input from the higher control system.

For example, based on a failure signal of inoperability input from the motor or brake for the rotor 4 of the moving object 1 or a fall signal input from an altimeter (not shown) in consideration of a fall speed according to weight, etc., the controller 50 may determine that the moving object 1 is in a predetermined situation, such as an emergency situation.

The expansion valve 31 and the first valve member 32 of the air conditioner module 20 may be operated so that the inflatable member 10 is expanded under the control of the controller 50, and at least a portion of the refrigerant in the refrigerant tank 28 or the refrigerant line 29 of the air conditioner module may be supplied to the inflatable member through the supply pipe 30 to rapidly inflate the inflatable member.

Inflation of the inflatable member 10 in a predetermined situation, particularly, an emergency situation, may be executed by expanding the low-temperature, high-pressure liquid refrigerant stored in the refrigerant tank 28 and guiding the expanded refrigerant toward the inflatable member, regardless of whether the air conditioner module 20 is operated or not. At this time, the refrigerant is at least room temperature and passes through the supply pipe 30 having a relatively high temperature to be vaporized in a gaseous state, and thus the refrigerant in a gaseous state may be supplied to the inflatable member.

Meanwhile, in the apparatus for absorbing shocks according to an exemplary embodiment of the present disclosure, the inflatable member 10 may be inflated by manual control by a person (a pilot or a driver) in the moving object 1.

For example, an input unit 52 to which a human instruction may be input may be electrically connected to the controller 50. The input unit may be configured to output a signal corresponding to a manual operation, an operation or voice of a person, and the controller may be configured to control an operation of the first valve member 32 for inflation of the inflatable member 10 to correspond to a signal received from the input unit.

The input unit 52 may be implemented as, for example, a scroll wheel, a button, a knob, a touch screen, a touch pad, a lever, a track ball, etc. that may be operated by a person, or at least one of a motion recognition sensor or a voice recognition sensor that detects a human motion or voice, or a combination thereof.

Thus, when a person selects to inflate the inflatable member 10 via the input unit 52, for example, the controller 50 may operate the first valve member 32 together with the expansion valve 31 to supply the refrigerant of the air conditioner module 20 to the inflatable member through the supply pipe 30 to inflate the inflatable member.

In addition, the controller 50 may be electrically connected to the temperature sensor 18 in the moving object 1. For example, when the temperature inside the moving object detected by the temperature sensor is out of a target temperature range, the controller may control the operation of at least the compressor 24 of the air conditioner module 20 until the temperature reaches a target temperature range for temperature control inside the moving object.

Moreover, the controller 50 may maintain cooling of the boarding space 3 and the cargo hold 6 in the moving object 1 by operating the air conditioner module 20, specifically, the compressor 24, the blower 23, and the blower 26, together with the inflation of the inflatable member 10 through the operation of the first valve member 32.

Also, selectively, the controller 50 may be electrically connected to the pressure sensor 12 of the inflatable member 10. For example, the controller 50 may adjust the opening degree of the third port 35 connected to the supply pipe 30 by controlling the operation of the first valve member 32 until pressure of the refrigerant in the inflatable member detected by the pressure sensor reaches a target pressure.

In this manner, by connecting the inflatable member 10 to the refrigerant line 29 of the air conditioner module 20 through the first valve member 32 and the supply pipe 30, the apparatus for absorbing shocks according to an exemplary embodiment of the present disclosure may supply at least a portion of the refrigerant in the refrigerant line 29 or the refrigerant tank 28 to the inflatable member in a gaseous state, so that the inflatable member may be rapidly inflated, and thus, the cargo C in the cargo hold 6 may be protected and a structure or person of the moving object 1 may be protected from shocks caused by the cargo in a predetermined situation.

In addition, in the apparatus for absorbing shocks according to an exemplary embodiment of the present disclosure, a flow rate of the refrigerant supplied through the supply pipe 30 may be adjusted to inflate the inflatable member 10 by the first valve member 32, and the inflatable member may be inflated and utilized to protect the cargo C in the cargo hold 6 selectively in parallel with cooling inside the moving object 1.

In addition, since the apparatus for absorbing shocks according to an exemplary embodiment of the present disclosure may use the refrigerant of the air conditioner module 20 already applied to the moving object 1, there is no need to add components for constructing a separate system, and thus, there is an advantage in that there is no need to concern about restrictions due to an increase in the weight of the moving object, together with cost reduction.

Figure 3:
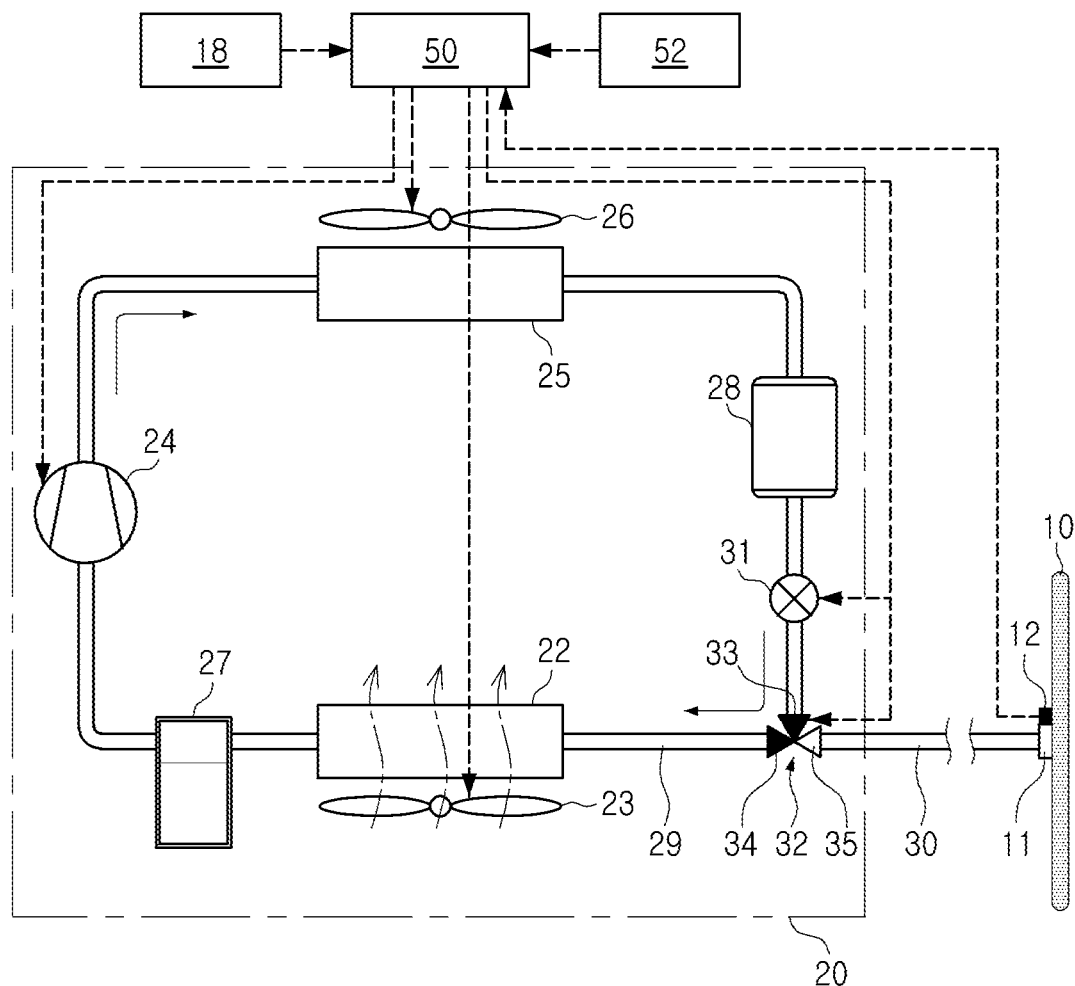
FIG. 3 is a view illustrating a case in which an apparatus for absorbing shocks according to an exemplary embodiment of the present disclosure is in a cooling mode.

FIG. 3 is a view illustrating a case in which an apparatus for absorbing shocks according to an exemplary embodiment of the present disclosure is in a cooling mode.

When the moving object 1 is in a normal state, the controller 50 may execute a cooling mode of the apparatus for absorbing shocks. The cooling mode is substantially the same as a cooling cycle of the air conditioner module 20.

External air introduced from the outside of the moving object 1 or internal air in the moving object may flow to the duct 19 through the air flow path of the case 21 constituting the air conditioner module 20.

Air flows by the blower 23 installed in the case 21, is heat-exchanged to a low temperature state, while passing through the evaporator 22, and is blown to the duct 19 to be discharged to the inside of the moving object, i.e., the boarding space 3 and/or the cargo hold 6.

The refrigerant that has passed through the evaporator 22 may pass through the condenser 25 positioned inside the air conditioner module 20 via the refrigerant line 29 by the operation of the compressor 24, and then circulate to the evaporator 22 through the refrigerant tank 28 and the expansion valve 31.

The compressor 24 may compress the refrigerant, and the condenser 25 may discharge heat from the refrigerant compressed by the compressor to condense the refrigerant.

The refrigerant tank 28 may store the condensed refrigerant, and the expansion valve 31 may depressurize and expand the high-pressure refrigerant, while throttling the refrigerant, thereby making the refrigerant be in a sprayed state that is easy to evaporate.

The refrigerant in the evaporator 22 may cool the air by taking heat from the air around the evaporator as the refrigerant is being vaporized.

In this cooling mode, the third port 35 of the first valve member 32 may be closed, and the first port 33 and the second port 34 may communicate with each other.

Accordingly, a cooling cycle of the air conditioner module 20 is performed, and cooling air is supplied to the boarding space 3 and/or the cargo hold 6 of the moving object 1, and a temperature thereof may be appropriately adjusted.

Figure 4:
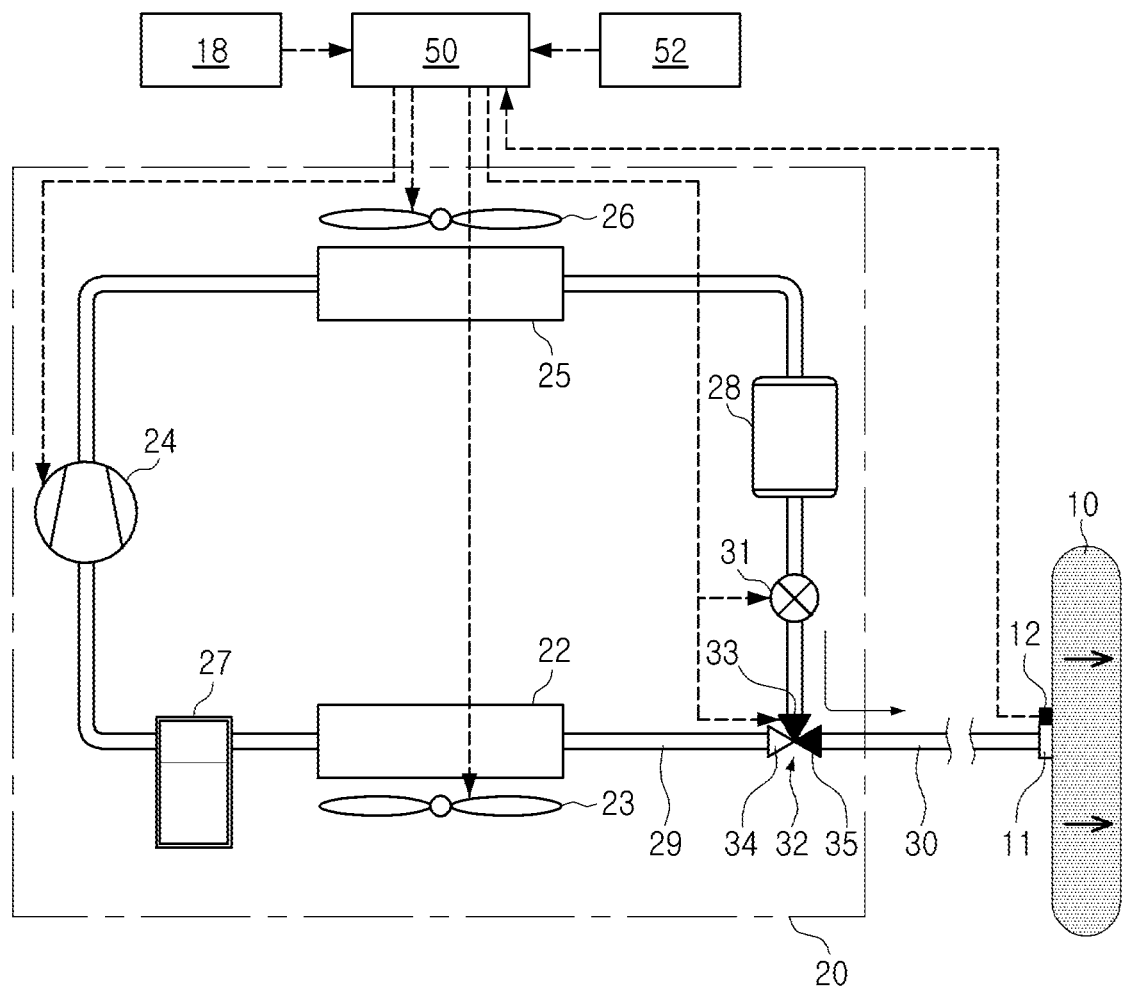
FIG. 4 is a view illustrating a case in which an apparatus for absorbing shocks according to an exemplary embodiment of the present disclosure is in a buffering mode.

FIG. 4 is a view illustrating a case in which an apparatus for absorbing shocks according to an exemplary embodiment of the present disclosure is in a buffering mode.

If a failure signal or a fall signal of the moving object 1 is input to the controller 50 or if a signal is input from the input unit 52 by a person, the controller may be configured to determine that the moving object is in a predetermined situation such as an emergency, etc. and execute the buffering mode.

The controller 50 may be configured to control the operation of the expansion valve 31 and the first valve member 32 so that the inflatable member 10 is inflated. In a state in which the expansion valve 31 is opened under the control of the controller 50, the second port 34 of the first valve member 32 may be closed and the first port 33 and the third port 35 may communicate with each other.

Accordingly, the high-pressure liquid refrigerant of about 18 to 20 bar stored in the refrigerant tank 28 may be depressurized and expanded by the expansion valve 31 to be supplied to the supply pipe 30 by the operation of the first valve member 32. As the refrigerant expanded to a low pressure is vaporized in a gaseous state, the refrigerant is passed through the supply pipe and supplied to the inflatable member 10 to rapidly inflate the inflatable member.

The inflated inflatable member 10 may safely protect the cargo C inside the cargo hold 6 of the moving object 1 from shocks when a physical shock has occurred. Moreover, the inflated inflatable member may prevent the cargo from damaging a structure of a moving object or from applying shocks to the person on board.

Figure 5:
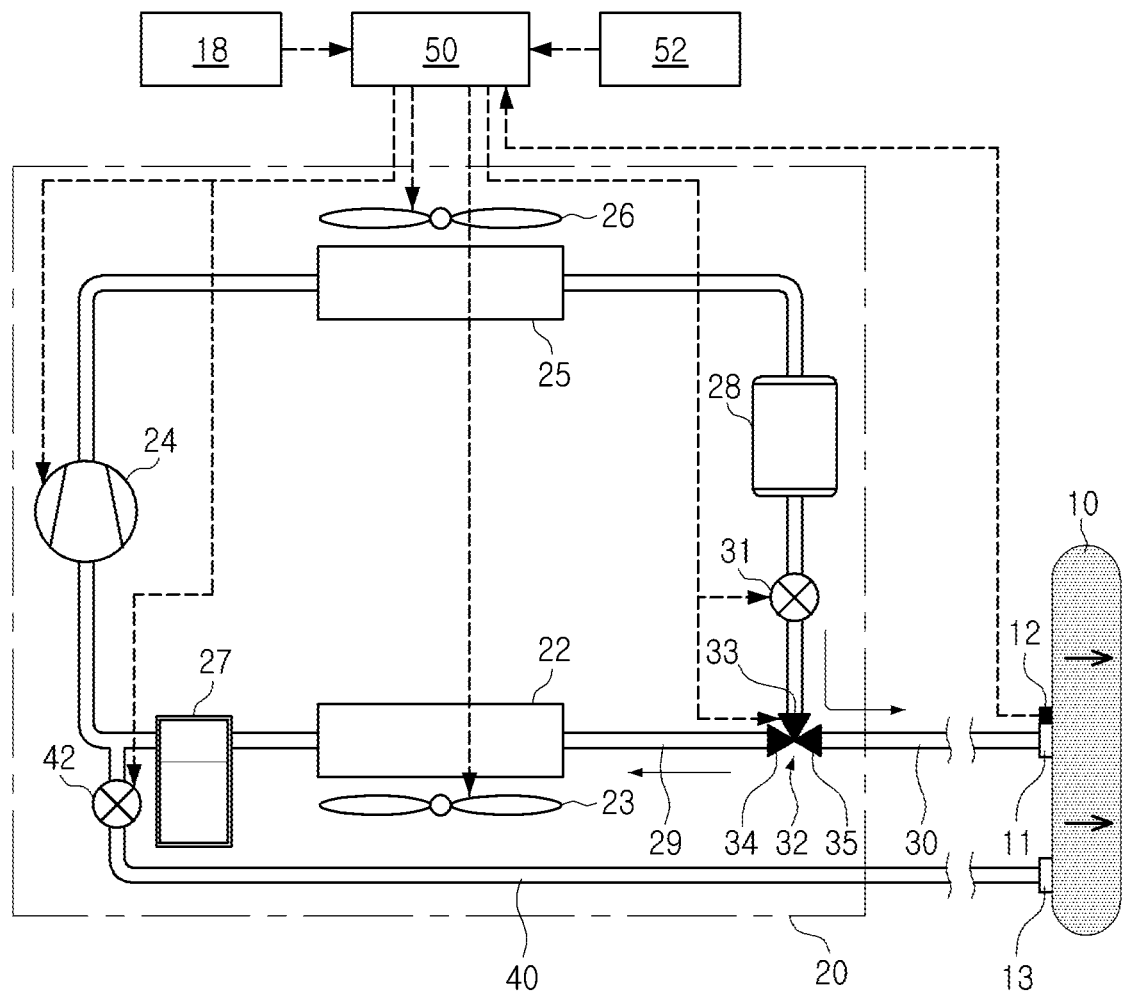
FIG. 5 is a view illustrating a case in which an apparatus for absorbing shocks according to an exemplary embodiment of the present disclosure is in a cooling and buffering mode.

FIG. 5 is a view illustrating a case in which an apparatus for absorbing shocks according to an exemplary embodiment of the present disclosure is in a cooling and buffering mode.

When the air conditioner module 20 and the inflatable member 10 of the apparatus for absorbing shocks need to operate simultaneously, the controller 50 may selectively execute the cooling and buffering mode.

Alternatively, when it is desired to simultaneously operate the air conditioner module 20 and the inflatable member 10 of the apparatus for absorbing shocks at all times, the controller 50 may execute the cooling and buffering mode.

Similar to the cooling mode, the refrigerant that has passed through the evaporator 22 passes through the condenser 25 located in the air conditioner module 20 via the refrigerant line 29 by the operation of the compressor 24, and then the refrigerant may circulate back to the evaporator 22 via the refrigerant tank 28 and the expansion valve 31.

The compressor 24 compresses the refrigerant, and the condenser 25 may discharge heat from the refrigerant compressed by the compressor to condense the refrigerant. The condensed refrigerant may be stored in the refrigerant tank 28.

The controller 50 may be configured to control the operation of the expansion valve 31 and the first valve member 32 so that the inflatable member 10 is inflated. In a state in which the expansion valve is opened under the control of the controller, all ports of the first valve member may be opened, and the first port 33, the second port 34, and the third port 35 may communicate with each other.

Accordingly, a partial refrigerant may be supplied to the evaporator 22 to vaporize in the evaporator and cool the air by taking heat from the air around the evaporator. At the same time, the remaining refrigerant may be supplied to the supply pipe 30, vaporized while passing through the supply pipe, and supplied to the inflatable member 10, thereby inflating the inflatable member.

As a result, a cooling cycle of the air conditioner module 20 may be formed and the temperature inside the moving object 1 may be appropriately adjusted, and the cargo C inside the cargo hold 6 may be safely protected and movement of the cargo may be prevented through the deployment and inflation of the inflatable member 10.

As such, the apparatus for absorbing shocks according to an exemplary embodiment of the present disclosure has the advantage of simultaneously implementing a cooling function and a buffering function.

Meanwhile, FIG. 5 shows an example having a recovery pipe 40 for collecting the refrigerant of the inflatable member 10 to the air conditioner module 20.

The controller 50 may be configured to control the operation of the second valve member 32 and the operation of the compressor 24 of the air conditioner module 20 so that the refrigerant line 29 of the air conditioner module and the flow path adjacent to the recovery pipe 40 communicate with each other.

In this case, the controller 50 may control the operation of the first valve member 32 to block a flow path adjacent to the supply pipe 30 connected to the refrigerant line 29 of the air conditioner module 20. The third port 35 of the first valve member may be closed under the control of the controller and the first port 33 and the second port 34 may communicate with each other.

As described above, by collecting the refrigerant from the inflatable member 10 to the refrigerant line 29 of the air conditioner module 20, the inflated inflatable member 10 may be contracted to its initial state.

Figure 6:
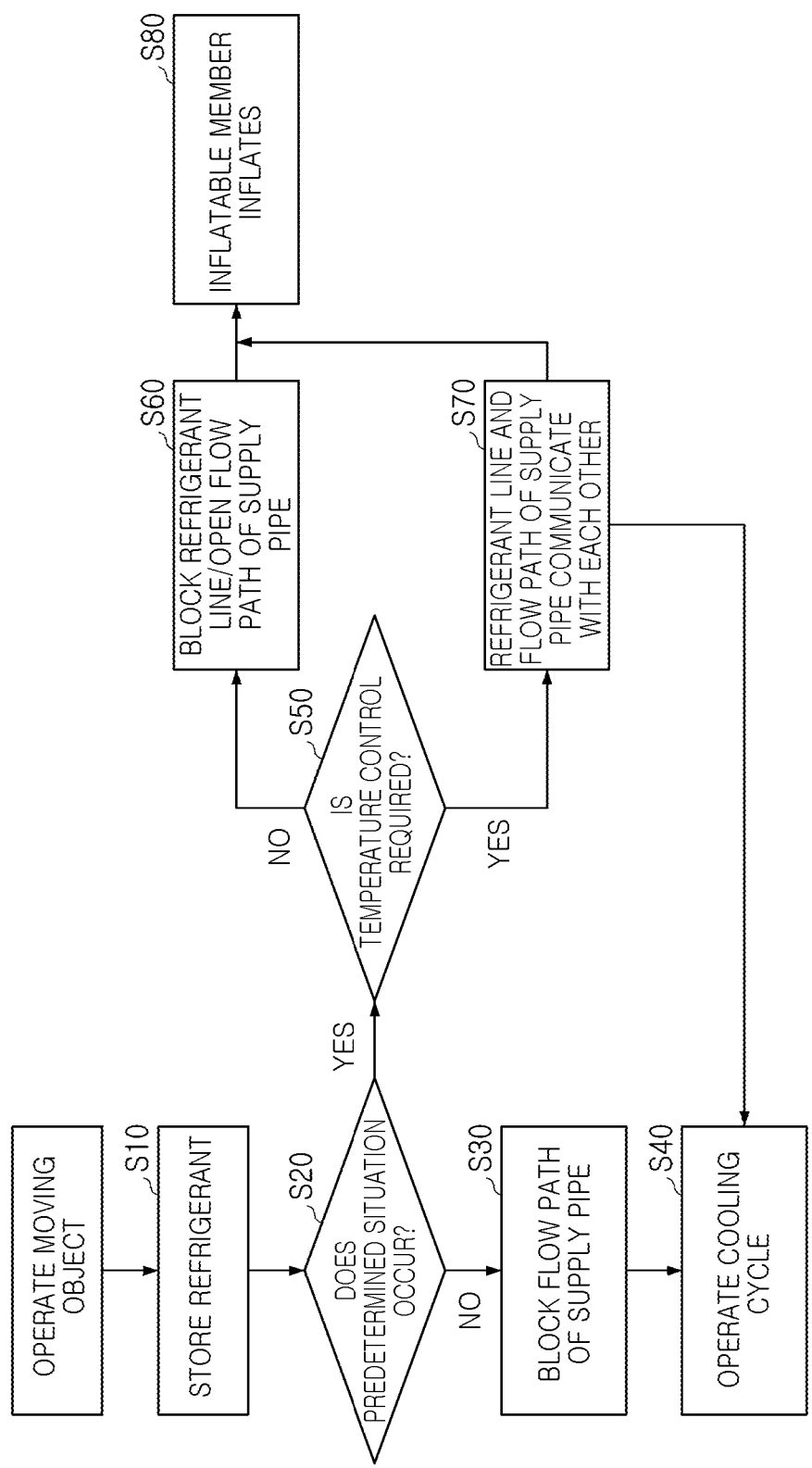
FIG. 6 is a flowchart illustrating an exemplary embodiment of a control method of an apparatus for absorbing shocks according to the present disclosure.

FIG. 6 is a flowchart illustrating a first exemplary embodiment of a control method of an apparatus for absorbing shocks according to the present disclosure.

The control method according to the first exemplary embodiment may include determining whether a predetermined situation of the moving object 1 has occurred and supplying at least a portion of the refrigerant in the refrigerant line 29 of the air conditioner module 20 to the inflatable member 10 installed in the moving object to inflate the inflatable member, if the predetermined situation has occurred.

First, when the moving object 1 is operating, a liquid refrigerant may be stored at a predetermined pressure in the refrigerant tank 28 of the air conditioner module 20 (S10). For example, the refrigerant may be stored at a pressure of about 18 to 20 bar.

The controller 50 may be configured to determine whether a predetermined situation of the moving object 1 has occurred (S20). For example, the controller may determine that the moving object is in a predetermined situation such as an emergency based on a failure signal of inoperability input from the motor or brake for the rotor 4 of the moving object or based on a fall signal input from an altimeter in consideration of a fall speed according to weight.

Selectively, the controller 50 may be configured to receive a signal related to a situation in which inflation of the inflatable member 10 is required from the input unit 52 by a person (a pilot or a driver) in the moving object 1.

If the predetermined situation does not occur, the controller 50 may control the operation of the first valve member 32 to block the flow path adjacent to the supply pipe connected to the refrigerant line 29 of the air conditioner module 20 (S30). The third port 35 of the first valve member may be closed under the control of the controller and the first port 33 and the second port 34 may communicate with each other.

Subsequently, the controller 50 may be configured to operate the compressor 24 of the air conditioner module 20, and the refrigerant may pass through the condenser 25 via the refrigerant line 29 by the operation of the compressor, and then circulate to the evaporator 22 through the refrigerant tank 28 and the expansion valve 31.

In the evaporator 22, the refrigerant may cool the air by taking heat from the air around the evaporator, while the refrigerant is being vaporized.

Accordingly, the cooling cycle of the air conditioner module 20 is operated (S40) so that air for cooling may be supplied to the boarding space 3 and/or the cargo hold 6 of the moving object 1 and the temperature may be appropriately adjusted.

If it is determined that the situation of the moving object 1 or a request from a person corresponds to the predetermined situation, it is determined whether the temperature inside the moving object is required to be controlled (S50). Whether the temperature is required to be controlled may be determined according to a temperature inside the moving object detected by the temperature sensor 18.

If the temperature inside the moving object 1 detected by the temperature sensor 18 is within the target temperature range so temperature control is not required, the controller 50 may be configured to control the operation of the first valve member 32 to block a portion of the refrigerant line 29 of the air conditioner module 20 and open a flow path adjacent to the supply pipe 30 (S60). The second port 34 of the first valve member may be closed under the control of the controller, and the first port 33 and the third port 35 may communicate with each other.

For example, the high-pressure liquid refrigerant stored in the refrigerant tank 28 may be depressurized and expanded by the expansion valve 31, and may be supplied to the supply pipe 30 by the operation of the first valve member 32.

As a result, the refrigerant may be supplied to the inflatable member 10 in a gaseous state, while passing through the supply pipe 30, and accordingly, the inflatable member may be rapidly inflated (S80).

The inflatable member 10 inflated in this manner may safely protect the cargo C in the cargo hold 6 of the moving object 1 from shocks when a physical shock has occurred. Moreover, the inflated inflatable member may prevent the cargo from damaging a structure of the moving object or applying shocks to a person on board.

If the temperature inside the moving object 1 detected by the temperature sensor 18 is out of the target temperature range so temperature control is required, the controller 50 may control the operation of the first valve member 32 so that the refrigerant line 29 of the air conditioner module 20 and the flow path adjacent to the supply pipe 30 communicate with each other (S70). All ports of the first valve member may be opened under the control of the controller, and the first port 33, the second port 34, and the third port 35 may communicate with each other.

Accordingly, a portion of the refrigerant may be supplied to the evaporator 22 to vaporize in the evaporator and cool the air by taking heat from the air around the evaporator. That is, the cooling cycle of the air conditioner module 20 may be operated (S40) to maintain the cooling function.

At the same time, the remaining refrigerant may be supplied to the supply pipe 30 to be supplied to the inflatable member 10 in a gaseous state, and accordingly, the inflatable member may be rapidly inflated (S80). Through the development and inflation of the inflatable member, a buffering function capable of safely protecting the cargo C inside the cargo hold 6 and preventing movement of the cargo may be implemented.

However, for example, in a very emergency situation, such as when a fall signal is input, the controller 50 may determine that temperature control is not necessary. Accordingly, the controller may be configured to immediately control the operation of the first valve member 32 to block a portion of the refrigerant line 29 of the air conditioner module 20 and open the flow path adjacent to the supply pipe 30 (S60), so that the inflatable member 10 may be rapidly inflated by the refrigerant (S80).

In other words, in a serious emergency situation, the function of temperature control may be stopped, and the operations for rapidly inflating the inflatable member 10 may be set as default.

Figure 7:
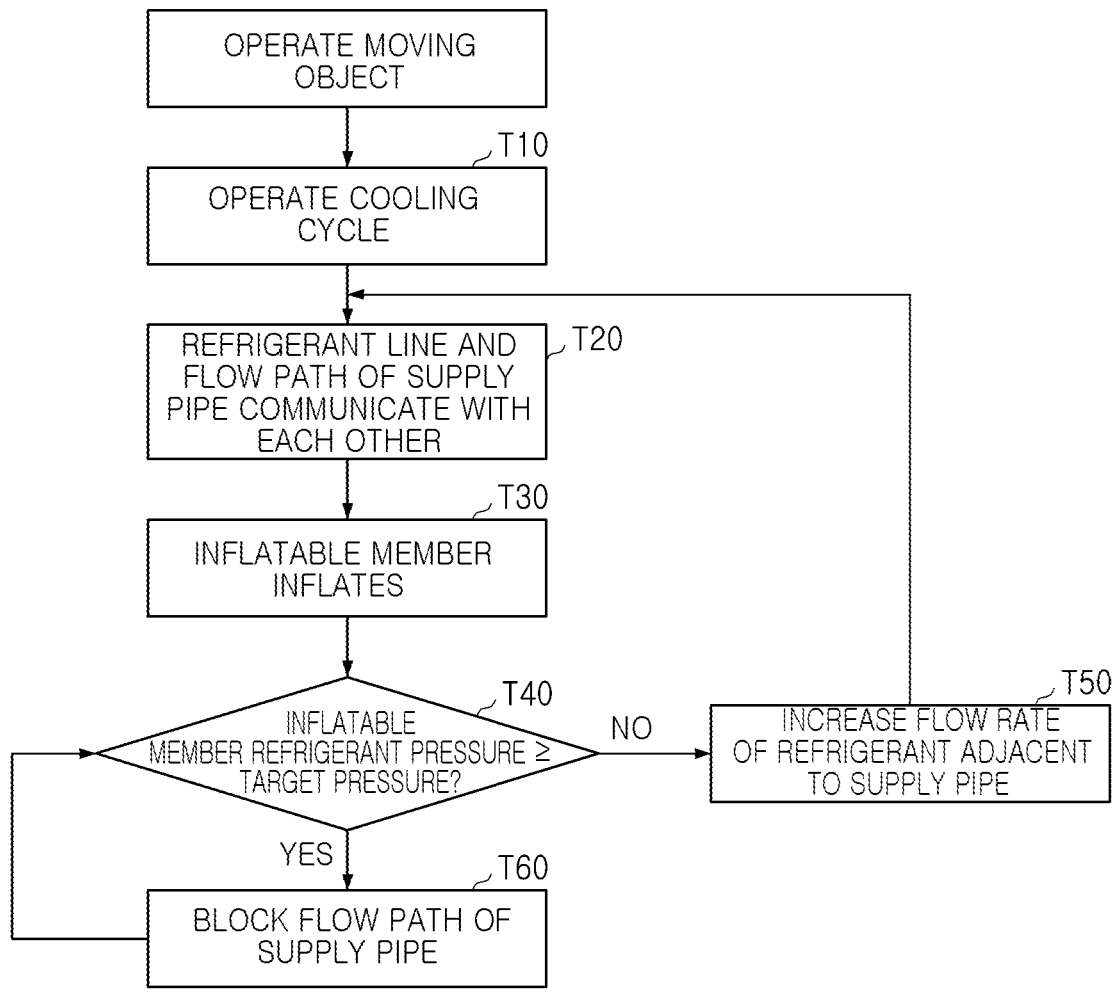
FIG. 7 is a flowchart illustrating an exemplary embodiment of a control method of an apparatus for absorbing shocks according to the present disclosure.

FIG. 7 is a flowchart illustrating a second exemplary embodiment of a control method of an apparatus for absorbing shocks according to the present disclosure.

The control method of the second exemplary embodiment may include operating a cooling cycle inside the moving object 1 and supplying at least a portion of the refrigerant in the refrigerant line 29 of the air conditioner module 20 to the inflatable member 10 installed in the moving object to inflate the inflatable member.

First, when the moving object 1 is operating, the cooling cycle of the air conditioner module 20 may be operated under the control of the controller 50 (T10).

Subsequently, the controller 50 may be configured to control the operation of the first valve member 32 so that the refrigerant line 29 of the air conditioner module 20 and the flow path adjacent to the supply pipe 30 communicate with each other (T20). All ports of the first valve member may be opened under the control of the controller, and the first port 33, the second port 34, and the third port 35 may communicate with each other.

Accordingly, a portion of the refrigerant may be supplied to the evaporator 22 to vaporize in the evaporator and cool the air by taking heat from the air around the evaporator. That is, the cooling cycle of the air conditioner module 20 may be operated (T10) to maintain the cooling function.

At the same time, the remaining refrigerant may be supplied to the supply pipe 30 to be supplied to the inflatable member 10 in a gaseous state, and thus the inflatable member may be inflated (T30). Through the development and inflation of the inflatable member, a buffering function capable of safely protecting the cargo C inside the cargo hold 6 and preventing movement of the cargo may be implemented.

The control method of the second exemplary embodiment may be applied to the cooling and buffering mode of the apparatus for absorbing shocks according to the present disclosure. For example, the cooling and buffering mode in which the air conditioner module 20 and the inflatable member 10 of the apparatus for absorbing shocks are operated simultaneously at all times may be executed.

Selectively, it may be determined whether the pressure of the refrigerant in the inflatable member 10 is equal to or greater than a target pressure (T40). The pressure of the refrigerant in the inflatable member may be detected by the pressure sensor 12.

If the pressure of the refrigerant in the inflatable member 10 detected by the pressure sensor 12 is less than a predetermined target pressure, the controller 50 may be configured to control the operation of the first valve member 32 to increase an opening degree of the third port 35 connected to the supply pipe 30 to increase a flow rate of the refrigerant adjacent to the supply pipe (T50) until the pressure of the refrigerant in the inflatable member reaches the target pressure.

When the pressure of the refrigerant in the inflatable member 10 detected by the pressure sensor 12 is equal to or greater than the predetermined target pressure, the controller 50 may be configured to control the operation of the first valve member 32 to block a flow path adjacent to the supply pipe 30 connected to the refrigerant line 29 of the air conditioner module 20 (T60). The third port 35 of the first valve member may be closed under the control of the controller, and the first port 33 and the second port 34 may communicate with each other.

Accordingly, the refrigerant is no longer supplied to the supply pipe 30, and the inflatable member 10 may be maintained in the developed and inflated state. The inflatable member 10 inflated in this manner may continuously safely protect the cargo C inside the cargo hold 6 of the moving object 1.

Afterwards, the pressure of the refrigerant in the inflatable member 10 may be detected by the pressure sensor 12 and it is determined whether the pressure is equal to or greater than the target pressure (T30), so that the pressure of the refrigerant in the inflatable member 10 may be continuously monitored. When the pressure drops, the controller 50 may be configured to control the operation of the first valve member 32 to supplement the refrigerant from the refrigerant line 29 of the air conditioner module 20.

Meanwhile, the control method of the second exemplary embodiment may further include collecting the refrigerant of the inflatable member 10 to the air conditioner module 20.

The controller 50 may be configured to control the operation of the second valve member 32 and the operation of the compressor 24 of the air conditioner module 20 so that the refrigerant line 29 of the air conditioner module and the flow path adjacent to the recovery pipe 40 communicate with each other.

In this case, the controller 50 may be configured to control the operation of the first valve member 32 to block the flow path adjacent to the supply pipe 30 connected to the refrigerant line 29 of the air conditioner module 20. The third port 35 of the first valve member may be closed under the control of the controller, and the first port 33 and the second port 34 may communicate with each other.

As such, by collecting the refrigerant from the inflatable member 10 to the refrigerant line 29 of the air conditioner module 20, the inflated inflatable member 10 may be contracted to its initial state, and accordingly, when the cargo C is loaded to the cargo hold 6 of the moving object 1 or unloaded from the cargo hold, there is no interference of the inflatable member, thereby improving convenience.

The present disclosure is described by taking, as an example, the apparatus for absorbing shocks for cargo in a cargo hold of a moving object, but the present disclosure is not necessarily limited thereto. For example, the present disclosure may be applied to the apparatus for absorbing shocks for a person in a moving object.

As set forth above, according to exemplary embodiments of the present disclosure, since the refrigerant of the air conditioner module, which is one of thermal management systems of the moving object, is used, the cargo or a person inside the moving object may be safely protected from shocks, without having to develop a separate component or construct a system for the apparatus for absorbing shocks.

Exemplary embodiments described herein use a controller configured to determine and control system components based on predetermined conditions. For example, exemplary embodiments of the apparatus for absorbing shocks may use a determination of a predetermined situation, predetermined pressure, predetermined temperature, predetermined targets, and/or predetermined angles. The predetermined conditions are values that are provided to or determined by the system before the condition actually arises and/or before the comparison with the condition is made. For example, a target pressure may be determined by the system and/or programed into the system prior to the target pressure being reached by the system and/or before the comparison to the target pressure is made by the system. The predetermined condition may be set to achieve the desired objective. For example, the pressure may be set based on a pressure limit of the inflatable member and/or a safety factor thereto. The predetermined situation may define by one or more conditions for determining whether an emergency situation has occurred such as described herein. The predetermined temperature may be set to accommodate the comfort of passengers and/or for the maintenance of the cargo.

In addition, according to an exemplary embodiment of the present disclosure, since components do not need to be added to construct a separate system for the apparatus for absorbing shocks, cost may be reduced and limitations due to an increase in the weight of the moving object may be solved.

While exemplary embodiments have been illustrated and described above, it will be apparent to those skilled in the art that modifications and variations could be made without departing from the scope of the present disclosure as defined by the appended claims.

What is claimed is:

1. An apparatus for absorbing shocks, the apparatus comprising:
   at least one inflatable member disposed in a moving object;
   an air conditioner module installed in the moving object having a refrigerant; and
   a supply pipe connected between the air conditioner module and the at least one inflatable member and providing the refrigerant of the air conditioner module to the at least one inflatable member;
   wherein the air conditioner module includes a refrigerant line circulating the refrigerant;
   wherein the supply pipe is connected to the refrigerant line via a first valve member; and
   wherein the first valve member is a three-way valve.

2. The apparatus of claim 1, wherein the at least one inflatable member is installed in a cargo hold in the moving object and is configured to be interposed in at least one of between a wall portion of the cargo hold and a cargo, between a ceiling of the cargo hold and a cargo, or between cargoes.

3. The apparatus of claim 1, further comprising a temperature sensor installed in the moving object to detect a temperature.

4. The apparatus of claim 1, wherein the air conditioner module further includes:
   a case fixed to the moving object and having an air flow path;
   an evaporator installed in the air flow path in the case to heat-exchange air passing therethrough with the refrigerant flowing within the evaporator;
   a compressor applying pressure to the refrigerant introduced after heat-exchange in the evaporator;
   a condenser condensing the refrigerant compressed by the compressor; and
   an expansion valve depressurizing and expanding the refrigerant passing through the condenser.

5. The apparatus of claim 4, wherein the air conditioner module includes a refrigerant tank storing at least a portion of the refrigerant in a liquid state passing through the condenser.

6. The apparatus of claim 4, wherein the first valve member is disposed between the expansion valve and the evaporator in the refrigerant line.

7. The apparatus of claim 4, wherein the first valve member is disposed between the compressor and the condenser in the refrigerant line.

8. A control method of the apparatus for absorbing shocks according to claim 1, the control method comprising:
   determining whether a predetermined situation of the moving object has occurred; and
   supplying at least a portion of the refrigerant in a refrigerant line of the air conditioner module to the at least one inflatable member installed in the moving object to inflate the at least one inflatable member, when the predetermined situation has occurred;
   wherein, in the determining of whether the predetermined situation has occurred, a controller installed in the moving object is configured to determine whether the predetermined situation has occurred based on at least one of a failure signal, a fall signal, and a signal received from an input unit.

9. The control method of claim 8, further comprising storing a liquid refrigerant in a refrigerant tank of the air conditioner module at a predetermined pressure.

10. The control method of claim 8, further comprising:
    when the controller has determined that the predetermined situation does not occur, blocking a flow path adjacent to the supply pipe connected to the refrigerant line of the air conditioner module; and
    operating a cooling cycle of the air conditioner module.

11. The control method of claim 8, further comprising:
    when the controller has determined that the predetermined situation has occurred, determining by the controller whether it is necessary to control temperature inside the moving object;
    when the controller has determined that temperature control is not required, blocking a portion of the refrigerant line and opening a flow path adjacent to the supply pipe connected to the refrigerant line; and when the controller has determined that temperature control is required, communicating the refrigerant line and the flow path adjacent to the supply pipe with each other.

12. A control method of the apparatus for absorbing shocks according to claim 1, the control method comprising:

operating a cooling cycle of the air conditioner module in the moving object; and supplying at least a portion of the refrigerant in a refrigerant line of the air conditioner module to the at least one inflatable member installed in the moving object to inflate the at least one inflatable member;

determining by a controller whether a pressure of the refrigerant in the at least one inflatable member is equal to or greater than a target pressure; and when the pressure of the refrigerant in the at least one inflatable member is less than the target pressure, increasing a flow rate of the refrigerant to the supply pipe until the pressure of the refrigerant the at least one inflatable member reaches the target pressure.

13. The control method of claim 12, further comprising:

when the pressure of the refrigerant in the at least one inflatable member is equal to or greater than the target pressure, blocking the flow path to the supply pipe.

14. An apparatus for absorbing shocks, the apparatus comprising:

at least one inflatable member disposed in a moving object;

an air conditioner module installed in the moving object having a refrigerant;

a supply pipe connected between the air conditioner module and the at least one inflatable member and providing the refrigerant of the air conditioner module to the at least one inflatable member; and a recovery pipe connected between the air conditioner module and the at least one inflatable member to recover the refrigerant of the at least one inflatable member to the air conditioner module.

15. The apparatus of claim 14, wherein the air conditioner module includes:

a case fixed to the moving object and having an air flow path;

an evaporator installed in the air flow path in the case to heat-exchange air passing therethrough with the refrigerant flowing within the evaporator;

a compressor applying pressure to the refrigerant introduced after heat exchange in the evaporator;

a condenser condensing the refrigerant co pressed by the compressor;

an expansion valve depressurizing and expanding the refrigerant passing through the condenser; and a refrigerant line circulating the refrigerant;

wherein the supply pipe is connected to the refrigerant line via a first valve member; and wherein one end portion of the recovery pipe is connected to an outlet of the at least one inflatable member, and an-other end portion of the recovery pipe is connected between the evaporator and the compressor in the refrigerant line.

16. The apparatus of claim 15, wherein a second valve member is provided in the recovery pipe, and the refrigerant is recovered from the at least one inflatable member through an operation of the second valve member and an operation of the compressor.

17. An apparatus for absorbing shocks, the apparatus comprising:

at least one inflatable member disposed in a moving object;

an air conditioner module installed in the moving object having a refrigerant;

a supply pipe connected between the air conditioner module and the at least one inflatable member and providing the refrigerant of the air conditioner module to the at least one inflatable member; and a controller installed in the moving object configured to selectively control the operation of the first valve member together with the operation of the expansion valve;

wherein the air conditioner module includes a refrigerant line circulating the refrigerant; and wherein the supply line is connected to the refrigerant line via a first valve member.

18. The apparatus of claim 17, wherein the controller is electrically connected to a pressure sensor of the at least one inflatable member, and is configured to adjust an opening amount of a port adjacent to the supply pipe with the first valve member by controlling an operation of the first valve member until pressure of the refrigerant in the at least one inflatable member detected by the pressure sensor reaches a target pressure.

* * * * *